(12) United States Patent
Embry et al.

(10) Patent No.: US 12,144,331 B2
(45) Date of Patent: *Nov. 19, 2024

(54) MODULARIZED SPINNERBAIT RIGS

(71) Applicants: Jason Dean Embry, Rock Hill, SC (US); Jacqueline Denise Embry, Rock Hill, SC (US)

(72) Inventors: Jason Dean Embry, Rock Hill, SC (US); Jacqueline Denise Embry, Rock Hill, SC (US)

(73) Assignee: 13 Ingenuities LLC, Rock Hill, SC (US)

( * ) Notice: Subject to any disclaimer, the term of this patent is extended or adjusted under 35 U.S.C. 154(b) by 422 days.

This patent is subject to a terminal disclaimer.

(21) Appl. No.: 17/667,050

(22) Filed: Feb. 8, 2022

(65) Prior Publication Data

US 2022/0295769 A1    Sep. 22, 2022

Related U.S. Application Data

(63) Continuation-in-part of application No. 17/539,820, filed on Dec. 1, 2021, now Pat. No. 12,063,916.

(60) Provisional application No. 63/173,780, filed on Apr. 12, 2021, provisional application No. 63/162,652, filed on Mar. 18, 2021.

(51) Int. Cl.
*A01K 85/10* (2006.01)
*A01K 85/00* (2006.01)

(52) U.S. Cl.
CPC ............ *A01K 85/10* (2013.01); *A01K 85/029* (2022.02); *A01K 85/1877* (2022.02)

(58) Field of Classification Search
CPC ........ A01K 85/10; A01K 85/02; A01K 85/12; A01K 85/122; A01K 85/16; A01K 85/029; A01K 85/1833; A01K 85/1837; A01K 85/1851; A01K 85/1857; A01K 85/1871; A01K 85/1877; A01K 85/00
USPC ........... 43/42.13, 42.09, 42.11, 42.08, 42.19, 43/42.36, 42.39, 44.81
See application file for complete search history.

(56) References Cited

U.S. PATENT DOCUMENTS

| | | | |
|---|---|---|---|
| 1,582,171 | A | 4/1926 | Foss |
| 2,121,474 | A | 6/1938 | Bowering |
| 2,145,283 | A | 1/1939 | Cesare |
| 2,238,292 | A | 4/1941 | Christophel |
| 2,319,026 | A | 5/1943 | Adam |
| 2,492,064 | A | 12/1949 | Rauh |
| 2,588,055 | A | 3/1952 | Smith |

(Continued)

FOREIGN PATENT DOCUMENTS

| | | | |
|---|---|---|---|
| AU | 2020207770 A1 | 2/2022 | |
| FR | 830549 A | 8/1938 | |

(Continued)

OTHER PUBLICATIONS

Office Action issued in related U.S. Appl. No. 17/539,820; Office Action issued Apr. 23, 2024; 10 pages.

(Continued)

*Primary Examiner* — Darren W Ark
*Assistant Examiner* — Sahar Almatrahi
(74) *Attorney, Agent, or Firm* — Thrive IP

(57) ABSTRACT

A modularized spinnerbait rig includes an embedded fork system to change a spinnerbait head in real time and includes a pivoting assembly to cause the spinnerbait head to pivot.

3 Claims, 10 Drawing Sheets

(56) References Cited

U.S. PATENT DOCUMENTS

| | | | |
|---|---|---|---|
| 2,619,764 A | 12/1952 | Mellin | |
| 2,623,318 A | 12/1952 | Weigandt | |
| 2,700,240 A | 1/1955 | Gibbs | |
| 2,706,867 A | 4/1955 | Ayres | |
| 2,940,204 A | 6/1960 | Mehnert | |
| 2,950,559 A | 8/1960 | Nelson | |
| 3,040,466 A | 6/1962 | Jablonski | |
| 3,253,363 A | 5/1966 | Steehn | |
| 3,387,402 A | 6/1968 | Mays | |
| 3,662,485 A | 5/1972 | Klemkowski, Jr. | |
| 4,432,157 A | 2/1984 | Gowing | |
| 4,665,642 A | 5/1987 | Steinman | |
| 5,077,931 A | 1/1992 | Marshall | |
| 5,918,405 A | 7/1999 | Marusak et al. | |
| 6,651,375 B2 | 11/2003 | Parrish | |
| 6,948,274 B1 * | 9/2005 | Sharp | A01K 85/16 43/42.22 |
| 6,978,571 B1 | 12/2005 | Nemire | |
| 7,059,080 B2 | 6/2006 | Bendel | |
| 7,107,719 B1 | 9/2006 | Scott | |
| 7,827,731 B2 | 11/2010 | Gibson | |
| 8,484,884 B2 | 7/2013 | Zuk | |
| 8,490,320 B1 | 7/2013 | Roberts | |
| 8,615,920 B2 | 12/2013 | Taylor et al. | |
| 8,689,479 B1 | 4/2014 | Smith | |
| 9,474,257 B1 * | 10/2016 | McGilvry | A01K 85/02 |
| 9,814,223 B2 | 11/2017 | Jarvis, III | |
| 10,194,646 B2 | 2/2019 | Walsh et al. | |
| 2011/0107653 A1 | 5/2011 | Tsai | |
| 2012/0000111 A1 | 1/2012 | Griffin | |
| 2013/0205643 A1 | 8/2013 | Smith et al. | |
| 2014/0190064 A1 | 7/2014 | Fellbaum | |
| 2014/0190065 A1 | 7/2014 | Ulianov | |
| 2014/0259869 A1 | 9/2014 | Scholfield | |
| 2015/0089858 A1 | 4/2015 | Burdick | |
| 2017/0000097 A1 | 1/2017 | Thomas | |
| 2017/0150703 A1 | 6/2017 | Fenton | |
| 2017/0156299 A1 * | 6/2017 | Reyment | A01K 85/18 |
| 2017/0181416 A1 | 6/2017 | Hunter | |
| 2017/0215395 A1 | 8/2017 | Offrink | |
| 2017/0360018 A1 | 12/2017 | Owens et al. | |
| 2019/0008128 A1 | 1/2019 | Walsh | |
| 2019/0313616 A1 | 10/2019 | Aguilar et al. | |
| 2020/0000073 A1 | 1/2020 | Walsh et al. | |
| 2020/0100482 A1 | 4/2020 | Hajjar | |
| 2020/0128804 A1 | 4/2020 | Fox | |
| 2020/0178510 A1 | 6/2020 | Choi | |
| 2020/0296945 A1 | 9/2020 | Jeffries | |
| 2020/0305400 A1 | 10/2020 | Britain, Jr. | |
| 2020/0352148 A1 | 11/2020 | Mancini | |
| 2023/0157267 A1 | 5/2023 | Peterson | |

FOREIGN PATENT DOCUMENTS

| | | |
|---|---|---|
| FR | 992492 A | 10/1951 |
| JP | 2016002011 A | 1/2016 |

OTHER PUBLICATIONS

Machine Translation of FR 830549; 3 pages.
Machine Translation of FR 992492; 3 pages.
Machine Translation of JP 2016002011; 5 pages.

* cited by examiner

MODULARIZED SPINNERBAIT RIGS

CROSS-REFERENCE TO RELATED APPLICATIONS

This continuation patent application claims priority to U.S. Utility patent application Ser. No. 17/539,820, filed in the United States Patent and Trademark Office (USPTO) on Dec. 1, 2021, which claims benefit of U.S. Provisional Patent Application Ser. No. 63/162,652 filed in the USPTO on Mar. 18, 2021, and U.S. Provisional Patent Application Ser. No. 63/173,780 filed in the USPTO on Apr. 12, 2021, all of which are incorporated herein by reference in their entireties.

BACKGROUND OF THE DISCLOSURE

A spinnerbait is a well-known lure in bass fishing. Experienced anglers understand that a variety of spinnerbait head designs, wire arm lengths, wire types, blade combinations, and added trailers can cause one spinnerbait to act differently from another spinnerbait. For instance, several types of spinnerbait heads, such as round heads, bullet heads, and keel (or minnow) heads, are used in different fishing environments under various conditions. Round heads, as the name implies, have fewer nip or pinch points susceptible to being trapped, so they are more suitable for fishing around rocks, branches, and stumps. Bullet heads, again as the name implies, have pointed designs that might become wedged in rocks and branches but can be used slowly through cover while also permitting fishing higher in a water column. Keel heads are designed for speed and are best for fishing for, e.g., smallmouth bass closer to a surface of clear water.

Typically, anglers make last minute modifications to their spinnerbaits in response to the time of year, weather conditions, water environment, fish species, et cetera. However, spinnerbait modifications usually are made with specialized tools such as split ring pliers while in the boat. This can be a time-consuming and challenging task that requires good hand-eye coordination, which may be particularly difficult for aging anglers.

What is needed in the industry is a solution to permit removal and replacement of spinnerbait components to adapt the spinnerbait to real time conditions, but which is simple and easy to use, especially for young, vision-impaired, or older arthritic anglers and the like.

BRIEF SUMMARY OF THE DISCLOSURE

The present disclosure is directed in general to a modular spinnerbait system that is simple to use, especially for young or physically challenged anglers. Various embodiments and equivalents of spinnerbait rigs employing a modularization fork, i.e., a spinnerbait modularization fork ("SBMF"), are described herein, which are simple to make and easy to use by almost anyone regardless of age or health to accommodate personal preferences and fishing conditions.

In one embodiment, a modifiable spinnerbait system includes a modular spinnerbait head having a body and a groove system formed within the body; a spinnerbait wire frame having a fork extending therefrom, the fork defining a tine extending in a direction of the groove system, the tine having an eyelet formed thereon and configured for seating within the groove system; a hook partially disposed in the body, the hook having a barb disposed apart from the body and an eye within the body alignable with the eyelet of the tine; and a retention device adapted for insertion through a surface of the body and for extension through the eye and eyelet to secure the fork to the body. The fork may have at least two tines, and the groove system includes at least two channels to receive the respective tines therein.

In another embodiment, a modifiable spinnerbait system includes a modular spinnerbait head having a body and a groove system formed within the body; a fork depending from a spinnerbait wire frame, the fork having a tine extending therefrom in a direction of the groove system, the tine having an eyelet formed thereon and configured for seating within the groove system; a hook partially disposed in the body, the hook having a barb disposed apart from the body and an eye within the body alignable with the eyelet of the tine; and a retention device adapted for insertion through a surface of the body and for extension through the eye and eyelet to secure the fork to the body. The fork may further include at least two tines, and the groove system may have at least two channels to receive the respective tines. The exemplary retention device may be a screw with a set of threads, and a receiver with a set of complementary threads to receive the screw threads. The retention device can be adjusted using a hand tool, for example, an Allen wrench.

In a further embodiment, a modifiable spinnerbait system may include a modular spinnerbait head having a body and a bilateral groove system formed within the body; a fork connectable to a spinnerbait wire frame, the fork having two tines extending therefrom in a direction of the groove system, the tines each having an eyelet formed thereon and configured for seating within the groove system; a hook having a barb disposed apart from the body and an eye disposed within the body and alignable with the eyelets of the tines when seated within the bilateral groove system; and a retention device adapted for insertion through a surface of the body and for extension through the eye and eyelet to secure the fork to the body. The retention device in this embodiment may be a screw with a set of threads and a receiver with a set of complementary threads to receive the threads of the screw. An Allen wrench or other type of screwdriver or tool can be used depending upon the type of heads used for the screw and receiver.

In yet another embodiment, a modifiable spinnerbait system may include a modular spinnerbait head having a body and a groove system formed within the body; a spinnerbait wire frame having a fork extending therefrom, the fork defining a tine extending in a direction of the groove system, the tine having an eyelet formed thereon and configured for seating within the groove system; a hook partially disposed in the body, the hook having a barb disposed apart from the body and an eye within the body alignable with the eyelet of the tine; and a pivoting retention device adapted for insertion through a surface of the body and for extension through the eye and eyelet to secure the fork to the body, the pivoting retention device being configured to cause the modular spinnerbait head to pivot relative to the spinnerbait wire frame.

In a further embodiment, a modifiable spinnerbait system may include a modular spinnerbait head having a body and a bilateral groove system formed within the body; a fork fixed to a spinnerbait wire frame, the fork having two tines extending therefrom in a direction of the groove system, the tines each having an eyelet formed therein and configured for seating within the groove system, at least one tine having a receiver affixed thereto; a hook having a barb disposed apart from the body and an eye disposed within the body and alignable with the eyelets of the tines when seated within the bilateral groove system; and a retention device adapted for insertion through a surface of the body and for extension through the eye and eyelet into the receiver to secure the fork to the body.

The receiver of the modifiable spinnerbait system may include threads, and the retention device may be a screw with a set of threads complementary to the threads of the receiver. Thus, the complementary threads of the screw are connectable to the threads of the receiver. The retention device may be adjusted by hand, or by utilizing a hand tool.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein.

DETAILED DESCRIPTION OF THE DISCLOSURE

Figure 1:
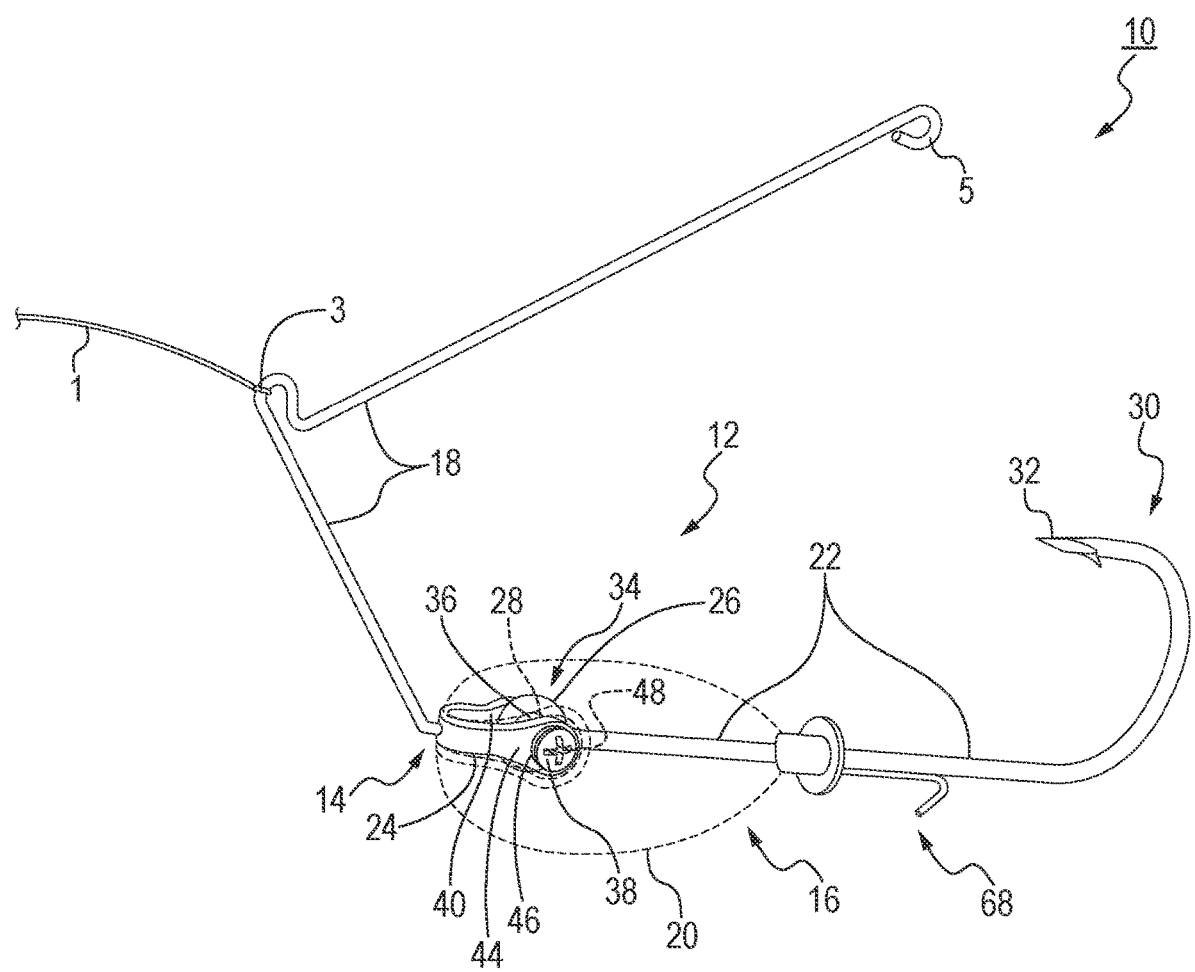
FIG. 1 is a perspective view of an embodiment of a spinnerbait rig according to the disclosure, particularly showing a spinnerbait modularization fork in a spinnerbait head (shown as transparent for clarity)

As required, detailed embodiments are disclosed herein; however, the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

Wherever the phrase "for example," "such as," "including," and the like are used herein, the phrase "and without limitation" is understood to follow unless explicitly stated otherwise. Similarly, "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, et cetera. Thus, for example, "a device having components a, b, and c" means that the device includes at least components a, b, and c. Similarly, the phrase: "a method involving steps a, b, and c" means that the method includes at least steps a, b, and c.

Where a list of alternative component terms is used, e.g., "a structure such as 'a,' 'b,' 'c,' 'd' or the like," or "a or b," such lists and alternative terms provide meaning and context unless indicated otherwise.

Unless the context clearly requires otherwise, throughout the description and the claims, the words "comprise," "comprising," and the like are to be construed in an inclusive sense as opposed to an exclusive or exhaustive sense; in the sense of "including, but not limited to."

The terms "spinnerbait modularization fork," "SBMF," "modular spinnerbait head," "modular spinnerbait system," "MSS," and "recessed bilateral groove system" have been coined by the inventor and have the meanings as one skilled in the art would understand by reading the present application and reviewing its drawings.

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, an embodiment of a modular spinnerbait system according to the disclosure is designated broadly by element number 10. The exemplary spinnerbait system 10 may include a spinnerbait rig 12 having a spinnerbait modularization fork ("SBMF") 14 that releasably connects to a modular spinnerbait head 16. Here, the SBMF 14 is connected to a wire frame 18 that in turn may be tied to a fishing line 1 using a fishing clip or a standard fisherman's knot 3. The wire frame 18 also may include an arm with a clevis 5 for attaching a movable blade for attracting fish (not shown). Although the SBMF 14 is shown in this example unilaterally formed with the wire frame 18, it may be formed separately and made detachable/attachable to the wire frame 18.

FIG. 1 further shows that the spinnerbait head 16 includes a body 20 (indicated in phantom for clarity) that may be may of lead or other suitably weighted material having an internally fixed fishing hook 22. Here, the SBMF 14 is seated in a recessed bilateral groove or channel system 24 within the body 20, as will be explained in greater detail below, and includes a left tine or finger 40 with a first aperture, grommet, or eyelet 42 and a right tine or finger 44 having a second aperture, grommet, or eyelet 46. Also shown in this example, the hook 22 is fixed within the body 20 and has a proximal end 26 with an opening, grommet, or eye 28, a distal end 30 with a barb 32, and may include a wire bait keeper 68 arranged between the proximal and distal ends 26, 30.

A retention device or mechanism 34 is used in FIG. 1 to connect the SBMF 14 to the hook 22 within the body 20. By way of example and not of limitation, the retention device 34 may include a left (or female) bolt or receiver 36 and a right (or male) end or screw 38. The receiver 36 and the screw 38 may be button head, nylon-insert lock nut with hexagon sockets or Phillips or flathead slots 48, which are compatible for use with a hand tool, such as an Allen wrench or a screwdriver. As shown, the receiver 36 and the screw 38 are inserted respectively through the eyelets 42, 46 of the SBMF 14 and through the eye 28 of the hook 22 to secure together the spinnerbait system 10 in a rapid, simple manner, which is particularly helpful for young or physically challenged anglers. Alternatively, the screw 38 may be a knurled knob as described below and is not limited to this example.

Figure 2:
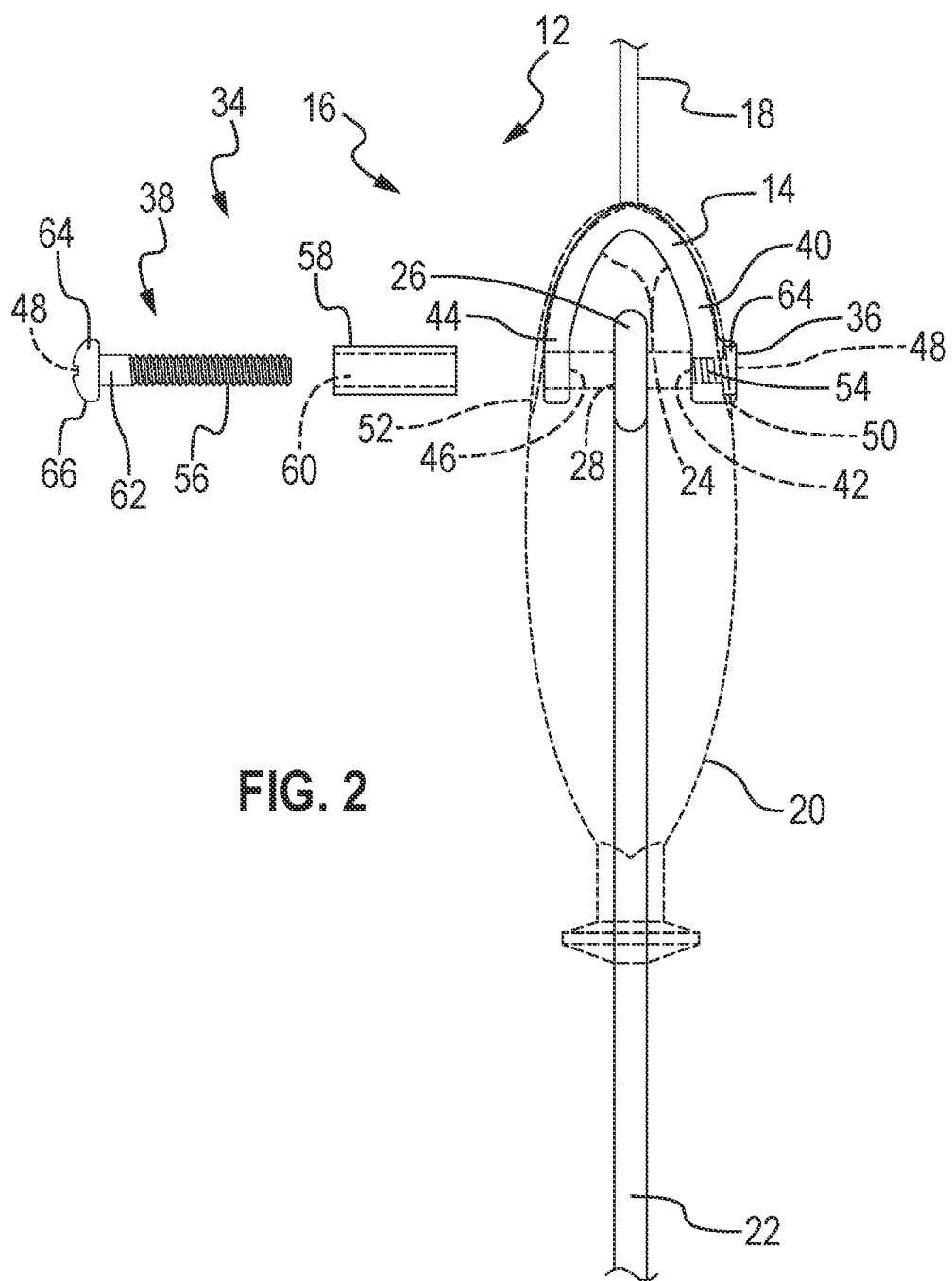
FIG. 2 is a partially exploded, top plan, partial view of the spinnerbait head (shown in phantom for clarity) as in FIG. 1.

With reference now to FIG. 2, the modular spinnerbait head 16 of the spinnerbait rig 12 introduced above is shown in further detail. Here, the wire frame 18 is attached to the body 20 (shown again in phantom for clarity) via the left and right fingers 40, 44 of the SBMF 14, which are seated in the recessed bilateral groove system 24 within the body 20. Likewise, a shank of the internally fixed fishing hook 22 is seated in the body 20. More particularly, the receiver 36 and the screw 38 of the retention device 34 are insertable into (or retractable from, as the case may be) respective left, right passages or channels 50, 52 in the body 20 and still further into the eyelets 42, 46 and into the opening 28 of the hook 22. As shown, the receiver 36 may include female threads 54 for receiving male threads 56 of the screw 38. In this example, the receiver 36 may include a separate exterior casing, shell, sleeve, or wall 58, or the casing 58 may be formed over the female threads 54 of the receiver 36. The casing 58 can be sized or shaped to fit tightly within and through the channels 50, 52 of the body 20, the eyelet 42 of the finger 40, and the eye 28 of the hook 22 to prevent rotational or lateral movement when the receiver 36 and the screw 38 are tightened together using respective slots or sockets 48. Also in this example, the receiver 36 may include a chamber 60 to provide an optimal compression fit when the threads 56 of the screw 38 are tightened into the female threads 54 of the receiver 36. Similarly, the screw 38 may include an unthreaded shaft 62 sized or shaped to fit through one or more of the channel 52, the eyelet 46, and the eye 28.

Although the exemplary receiver 36 in FIG. 2 has a button head 64, and the exemplary screw 38 has a flat head 66 to provide a smooth surface on the body 20, those skilled in the art will understand that other assemblies may be utilized, and the disclosure is not limited to the exemplary receiver 36 and screw 38. For instance, the sockets 48 of the heads 64, 66 may be constructed to appear as "prey eyes" to attract fish. Moreover, the terms "left," "right," "male," and "female" used herein are merely for reference as the exemplary arrangements could be reversed. Still further, although the SBMF 14 is shown by way of example using left and right fingers 40, 44, in some embodiments a single finger could be coupled to the eye 28 of the hook 22, or additional fingers, such as in a trident configuration, could be utilized. Additionally, although the eye 28 and/or the eyelets 42, 46 are shown herein as being substantially round and closed, one or more of them could be partially open (as in a hook catch) and/or shaped differently, such as square-shaped to address stretching or flexing. Likewise, the groove system 24 could be shaped differently from the examples shown in order to accommodate differently shaped fingers 40, 44 and respective eyelets 42, 46.

Figure 3:
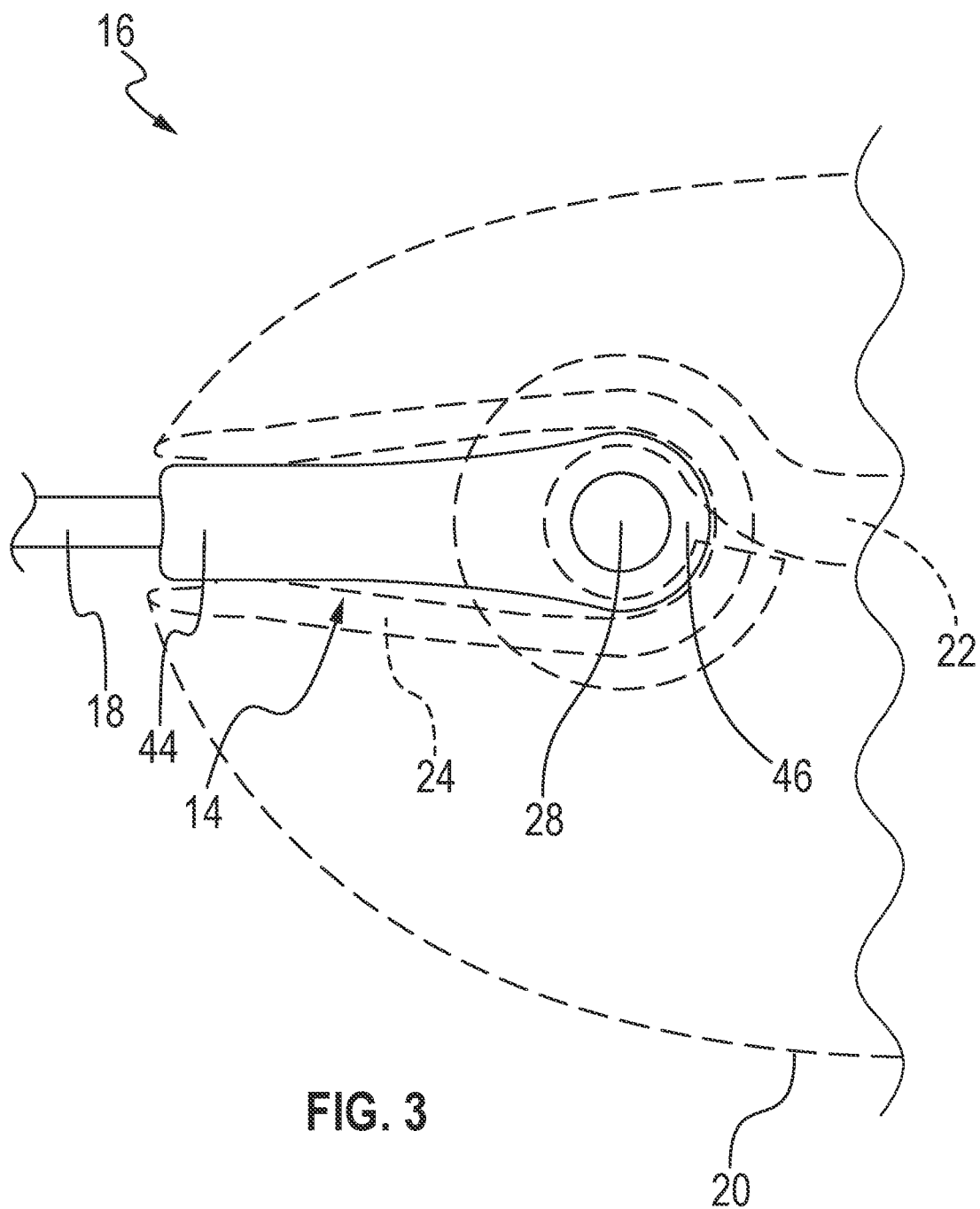
FIG. 3 is a partial, detailed side elevational view of the spinnerbait head (shown in phantom for clarity) as in FIGS. 1 and 2, particularly showing a groove system in the spinnerbait head.

With reference to FIG. 3, the modular spinnerbait head 16 with the wire frame 18 attached to the SBMF 14 is shown inserted in the body 20 (shown in phantom for clarity). More particularly, the left finger 44 of the SBMF 14 is most clearly shown seated in the recessed bilateral groove system 24 within the body 20. The eye 28 of the internally fixed fishing hook 22 (partially shown in phantom) is seated in the body 20 with the eye 28 and the eyelet 46 of the finger 44 aligned and ready to receive the retention device 34 (see, e.g., FIG. 2).

Figure 4:
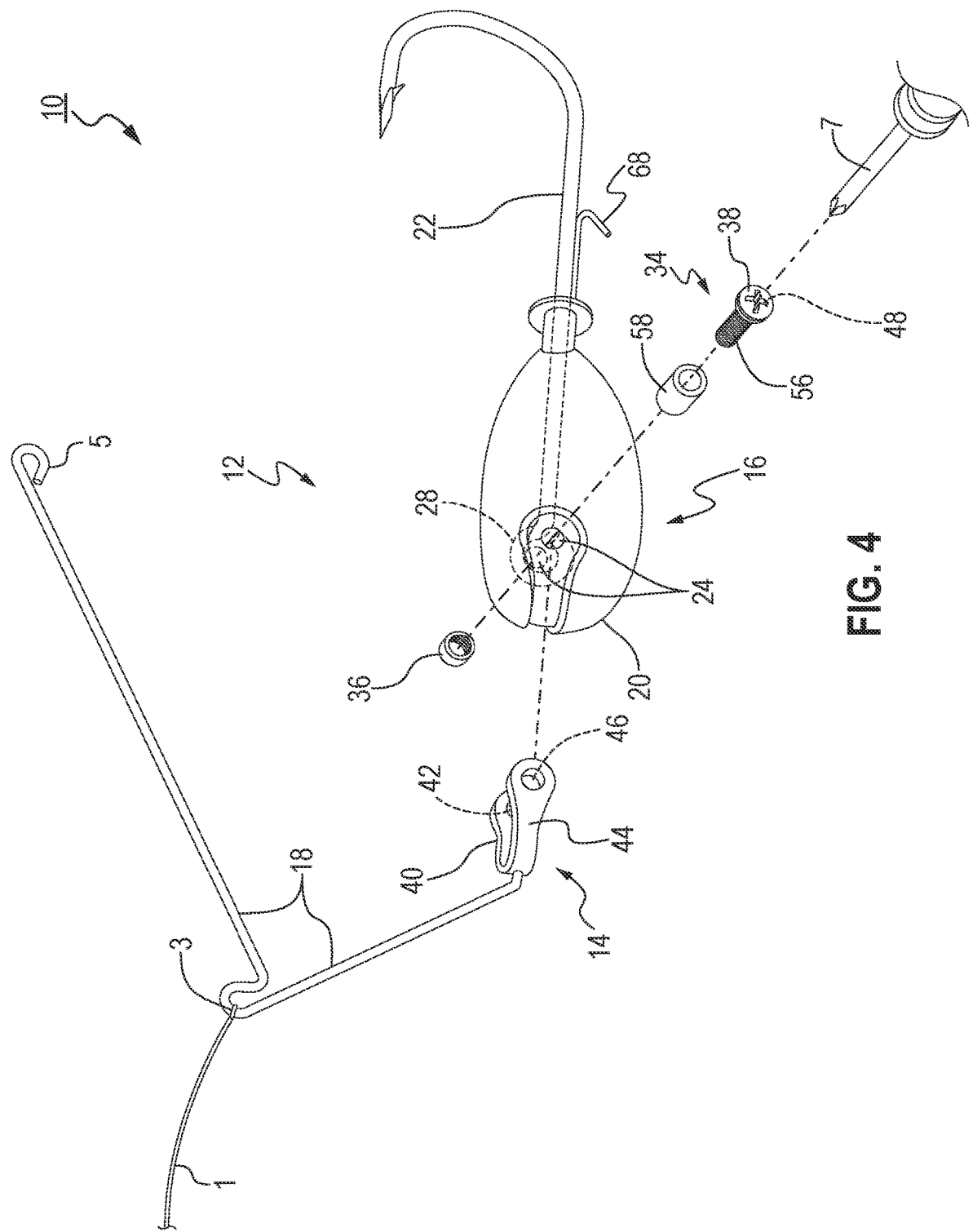
FIG. 4 shows a detailed exploded view of the embodiment as in FIG. 1.

Turning now to FIG. 4, an exemplary operation of the modular spinner bait system 10 is shown. Here, the SBMF 14 is in a released or separated state from the spinner bait rig 12 such that the SBMF 14 and the wire frame 18 with clevis 5 are attached to the line 1 via a knot 3 while the modular spinnerbait head 16 with the internally fixed hook 22, bait keeper 68, and eyelet 28 are detached. More particularly, the left finger 40 and its eyelet 42 and the right finger 44 and its eyelet 46 have been separated from (or are being reunited with) the recessed bilateral groove system 24 within the body 20. In this example, a screwdriver 7 is being used to release (or reinstall) the retention device 34 to in turn release (or secure) the fingers 40, 44 of the SBMF 14 from (or into) the groove system 24. As introduced above, the retention device 34 may include the receiver 36 and the screw 38 shown here with respective male threads 56 and the casing 58 to connect through the eyelets 42, 46 and the eye 28 to secure together (or disassemble) the spinnerbait system 10 in a rapid, simple manner, particularly for young or physically challenged anglers.

Figure 5:
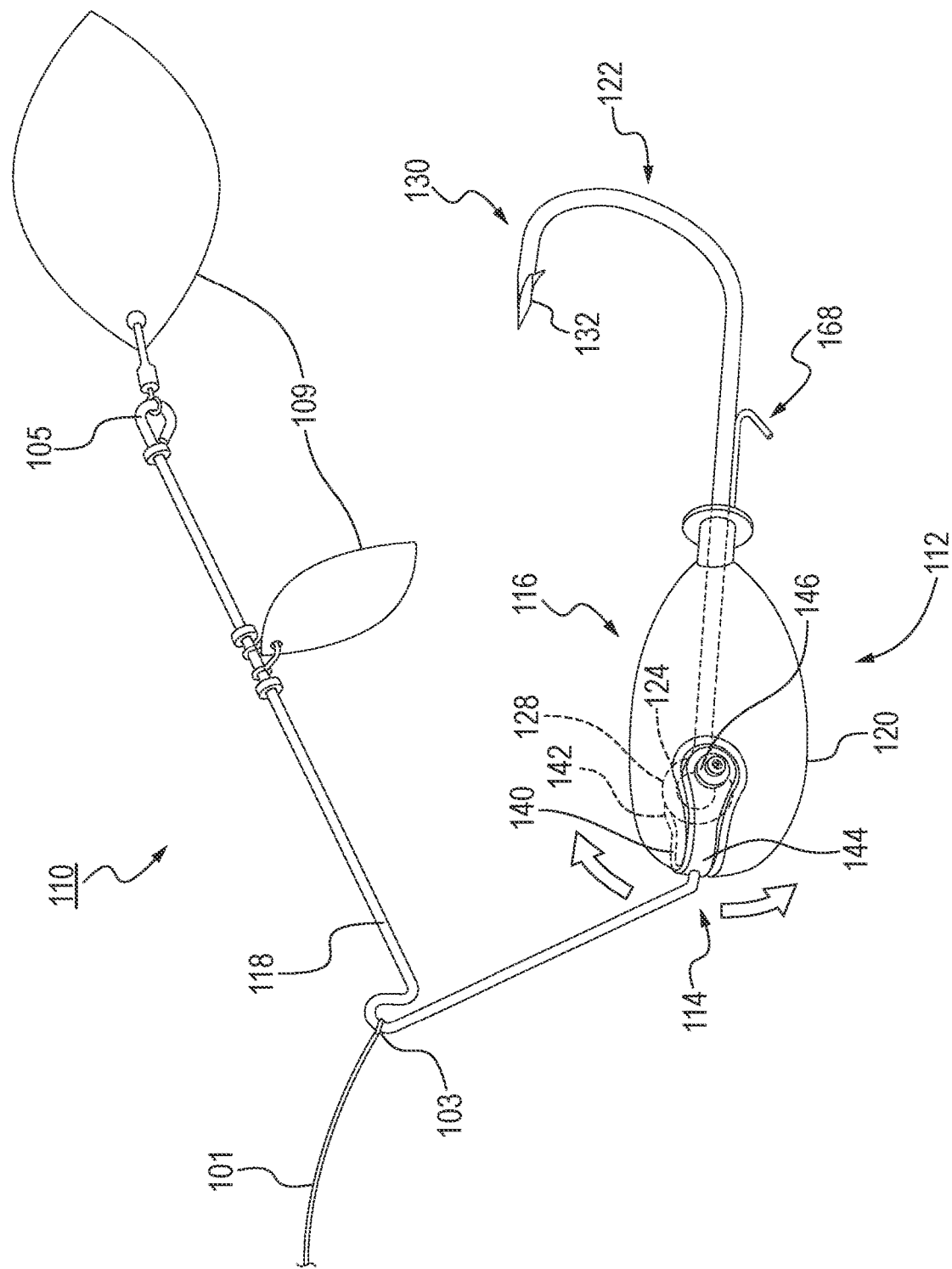
FIG. 5 is a perspective view of another embodiment of a spinnerbait rig according to the disclosure.
Figure 6:
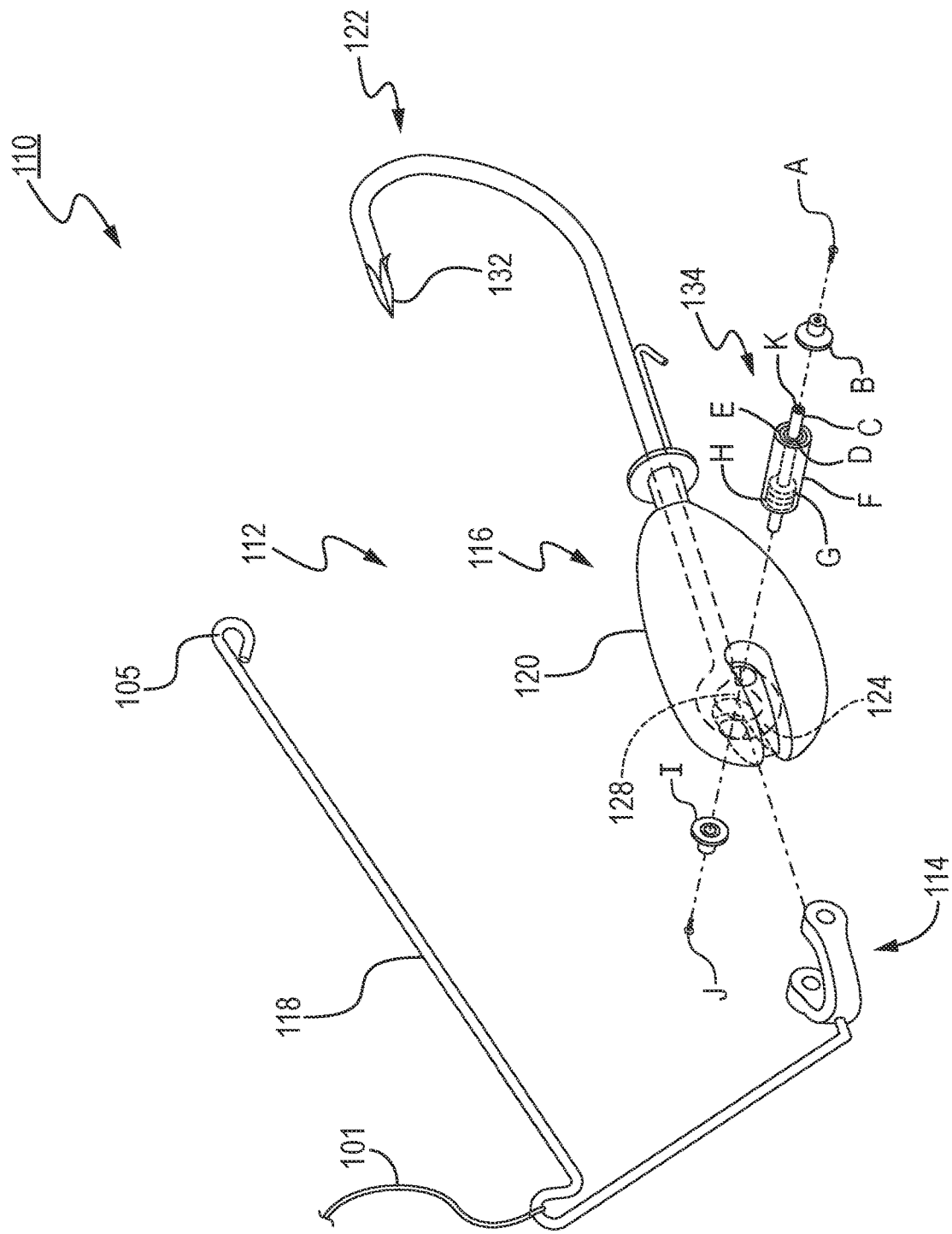
FIG. 6 is an exploded view of the embodiment as in FIG. 5.

FIGS. 5 and 6 show another embodiment of a Modular Spinnerbait System (MSS) with pivoting option designated broadly by element number 110. The exemplary spinnerbait system 110 may include a spinnerbait rig 112 having a spinnerbait modularization fork ("SBMF") 114 that releasably connects to a modular spinnerbait head 116. Here, the spinnerbait head 116 may include a lead body 120 (shown transparent for clarity) with an internally connected fishing hook 122, and bait keeper 168. The SBMF 114 is further connected to a wire frame 118 that in turn may be tied to a fishing line 101 using a fishing clip or a standard fisherman's knot 103. The wire frame 118 also may include an arm with a clevis 105 for attaching one or more movable blades 109 for attracting fish. Although the SBMF 114 is shown in this example unilaterally formed with the wire frame 118, it may be formed separately and made detachable and attachable to the wire frame 118.

FIGS. 5 and 6 further show that the SBMF 114 is seatable in a recessed bilateral groove or channel system 124 within the body 120. The SBMF 114 includes a left tine or finger 140 with a first aperture, grommet, or eyelet 142 and a right tine or finger 144 having a second aperture, grommet, or eyelet 146. Also shown in this example, the hook 122 is fixed within the body 120 and has a proximal end 126 with an opening, grommet, or eye 128 and a distal end 130 with a barb 132. As indicated by the curved double arrows, the channel system 124 permits the body 120 to pitch and move relative to the SBMF 114 to mimic swimming prey.

FIG. 6 more specifically shows that the pivoting retention device 134 of the MSS 110 may include a male end retention device A, an SBMF retaining cap B, a free-floating pivoting guide rod C, a roller bearing D, a roller bearing seating cap E, an SBMF roller bearing assembly F, a roller bearing seating cap G, a roller bearing H, an SBMF retaining cap I, a male end SBMF retention device J, and an SBMF attachment point K. These components operate to provide the pivoting feature described above (see double pivoting arrows in FIG. 5). An angler can choose to use the pivoting retention device 134 or the seated groove system described in foregoing embodiments.

Figure 7:
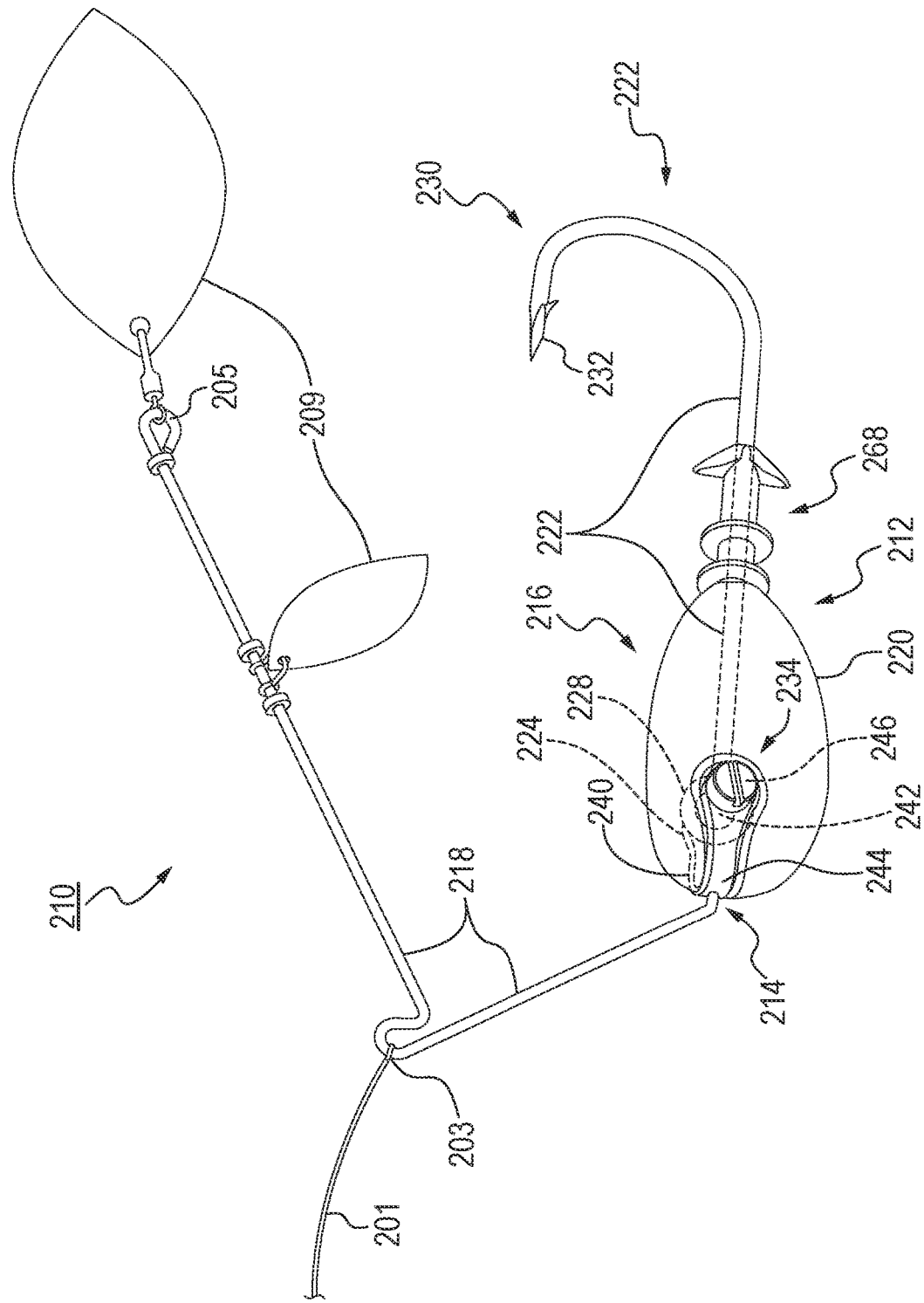
FIG. 7 is a perspective view of a further embodiment of a spinnerbait rig according to the disclosure, particularly showing a spinnerbait modularization fork in a spinnerbait head (shown as transparent for clarity)

Turning to FIG. 7, another embodiment of a modular spinnerbait system according to the disclosure is designated broadly by element number 210. The exemplary spinnerbait system 210 may include a spinnerbait rig 212 having a spinnerbait modularization fork ("SBMF") 214 that releasably connects to a modular spinnerbait head 216. Here, the SBMF 214 is connected to a wire frame 218 that in turn may be tied to a fishing line 201 using a fishing clip or a standard fisherman's knot 203. The wire frame 218 also may include an arm with a clevis 205 for attaching one or more movable blades 209 for attracting fish. Although the SBMF 214 is shown in this example unilaterally formed with the wire frame 218, it may be formed separately and made detachable/attachable to the wire frame 218.

Figure 8:
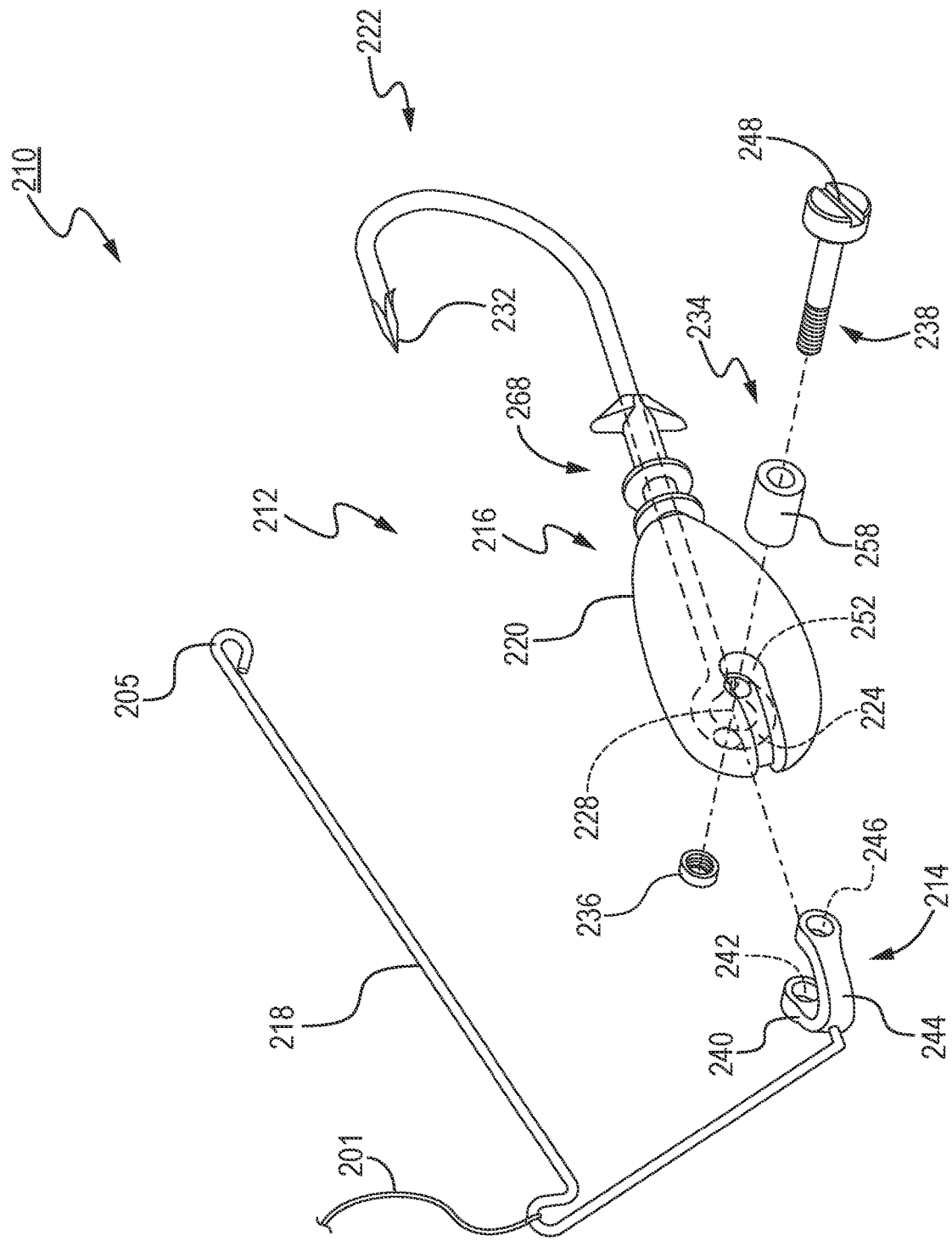
FIG. 8 shows a detailed exploded view of the embodiment as in FIG. 7.

FIGS. 7 and 8 further shows that the spinnerbait head 216 includes a body 220 that may be may of lead or other suitably weighted material having an internally fixed fishing hook 222 with a bait keeper 268. Here, the SBMF 214 is seated in a recessed bilateral groove or channel system 224 within the body 220, and includes a left tine or finger 240 with a first aperture, grommet, or eyelet 242 and a right tine or finger 244 having a second aperture, grommet, or eyelet 246. Also shown in this example, the hook 222 is fixed within the body 220 and has a proximal end 226 with an opening, grommet, or eye 228 and a distal end 230 with a barb 232. A retention device or mechanism 234 is used to connect the SBMF 214 to the hook 222 within the body 220. By way of example and not of limitation, the retention device 234 may include a left (or female) bolt or receiver 236 and a right (or male) end 238, which may be a knurled knob as shown. The receiver 236 and the knob 238 eliminates a need for a hand tool, although it can be provided with a screwdriver slot 248 if desired.

As most clearly shown in FIG. 8, the receiver 236 and the knob 238 are inserted respectively through the eyelets 242, 246 of the SBMF 214 and through the eye 228 of the hook 222. In this example, the retention device 234 may include a separate exterior casing, shell, sleeve, or wall 258, or the casing 258 may be formed over the female threads 254 of the receiver 236. The casing 258 can be sized or shaped to fit tightly within and through a channel 252 of the body 220, the eyelets 242, 246 of the fingers 240, 244, and the eye 228 of the hook 222 to prevent rotational or lateral movement when the knurled knob 248 is tightened or screwed into the receiver 236. Thus, the spinnerbait system 210 can be used in a rapid, simple manner that is particularly helpful for young or physically challenged anglers.

Figure 9:
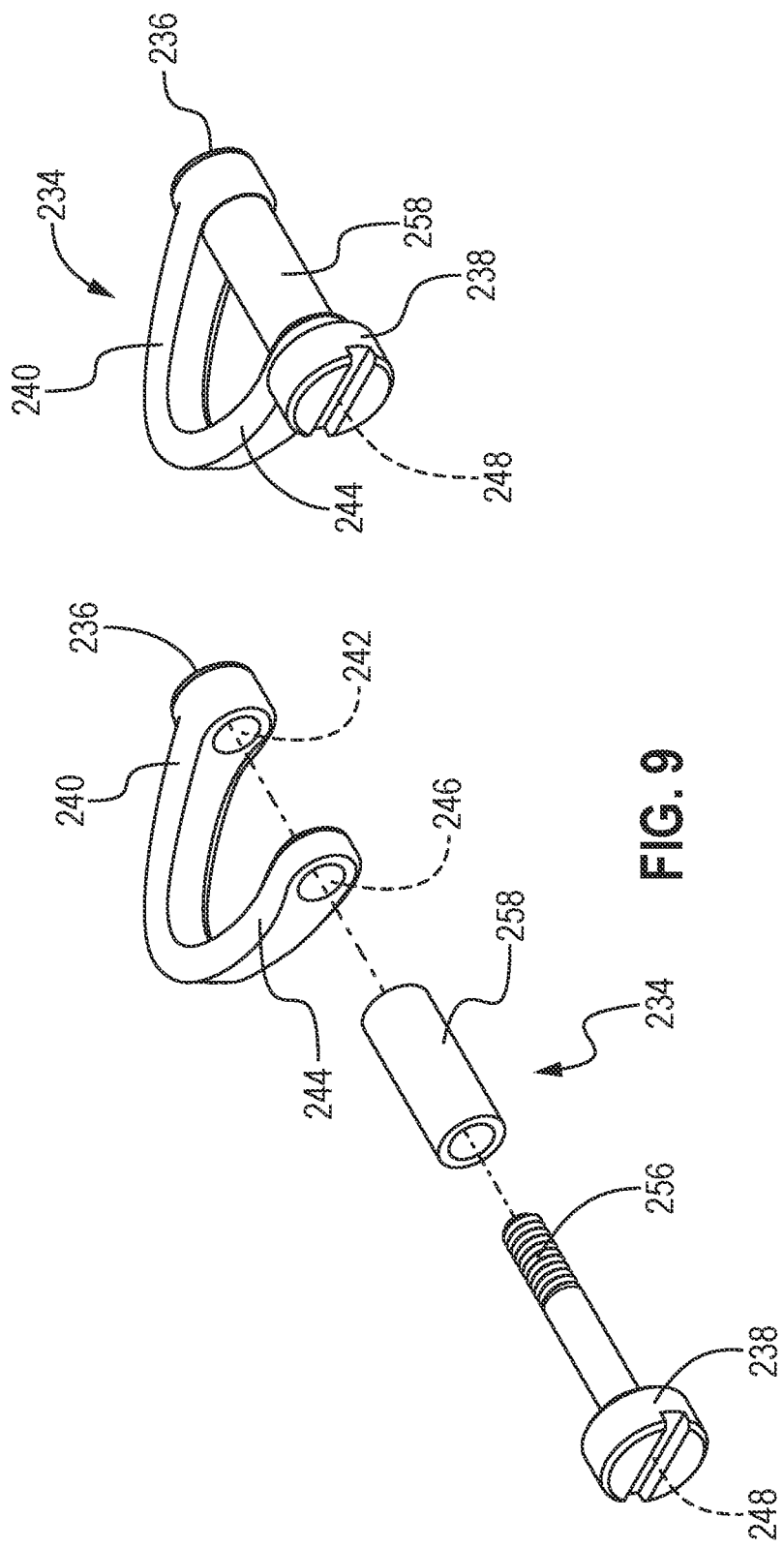
FIG. 9 includes exploded and assembled views of some components as used in the embodiment of FIG. 7.

FIG. 9 particularly shows that the receiver 236 and the knob 238 are inserted respectively through the eyelets 242, 246 of the SBMF 214 (not shown to scale). Again, the retention device 234 may include the casing 258 as a separate component of the retention device 234 but in this example, the receiver 236 is shown as an integral part of the finger 240 in which the knob 238 can tightened into the receiver 236 using the threads 256 and/or the slot 248.

Figure 10:
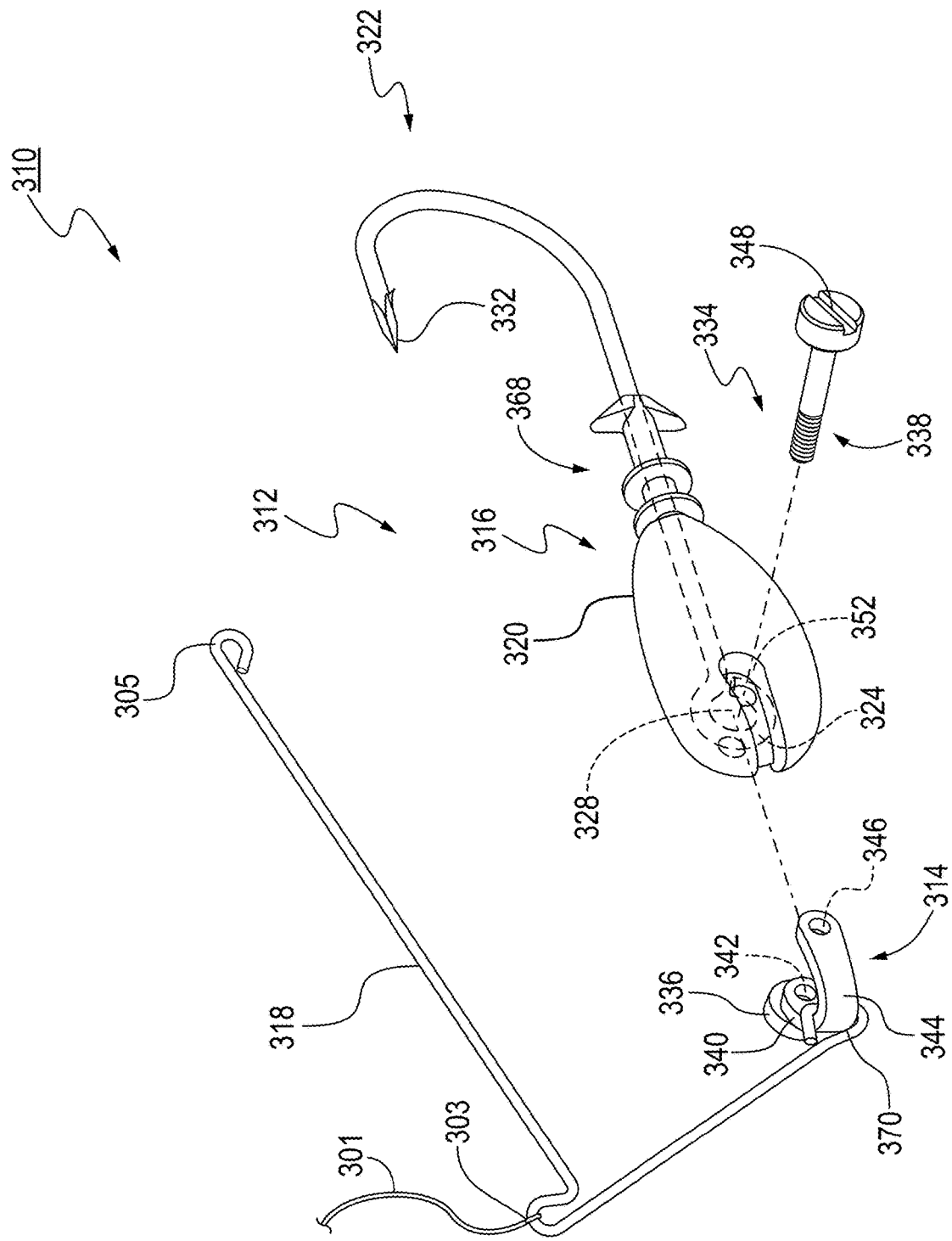
FIG. 10 is a detailed exploded view of another embodiment of a spinnerbait rig according to the disclosure.

Turning to FIG. 10 another embodiment of a modular spinnerbait system is designated broadly by element number 310. Here, the exemplary spinnerbait system 310, shown partially disassembled, may include a spinnerbait rig 312 having a receiving fork 314 that releasably connects to a modular spinnerbait head 316. The wire frame 318, as shown, may be tied to a fishing line 301 using a fishing clip or a standard fisherman's knot 303 and may terminate in a clevis 305 for attaching one or more movable blades (not shown) for attracting fish.

FIG. 10 also shows that the fork 314 may be connected to a wire frame 318 via a terminal connection or wrap 370. The connection 370 may be accomplished by crimping or wrapping the wire 318 around the fork 314. Wrapping the wire 318 in conjunction with welding has been found to increase welding strength to prevent the wire 318 from detaching from the fork 314 due to twisting, pulling, and other forces that may be exerted on the system 310 by a hooked fish.

FIG. 10 further shows that the spinnerbait head 316 includes a body 320 that may be formed from lead or other suitably weighted material having an internally fixed fishing hook 322 with a bait keeper 368. Here, the fork 314 is seated in a recessed bilateral groove or channel system 324 within the body 320, and includes a left tine or finger 340 with a first aperture, grommet, or eyelet 342 and a right tine or finger 344 having a second aperture, grommet, or eyelet 346. Also shown in this example, the hook 322 is fixed within the body 320 and has a proximal end 326 with an opening, grommet, or eye 328 and a distal end 330 with a barb 332. A retention device or mechanism 334 is used to connect the fork 314 to the hook 322 within the body 320. By way of example and not of limitation, the retention device 334 may include a left (or female) bolt or receiver 336 and a right (or male) end 338, which may be a knurled knob as shown. The receiver 336 and the knob 338 eliminates a need for a hand tool, although it can be provided with a screwdriver slot 348 if desired. Further, the receiver 336 in this example is fixed to the left tine 340, although the components can be reversed and are not limited to the example shown.

FIG. 10 further shows that the knob 338 aligns with and is tightened into the receiver 336 after the fork 314 is inserted in a channel 352 of the body 320, and the knob 238 is inserted through the eyelets 342, 346 of the fork 314 and through the eye 328 of the hook 322. Thus, the spinnerbait system 310 can be used in a rapid, simple manner that is particularly helpful for young or physically challenged anglers.

Exemplary embodiments of the disclosure may include but are not limited to:

Embodiment 1

A modifiable spinnerbait system, comprising a modular spinnerbait head having a body and a groove system formed within the body, a fork depending from a spinnerbait wire frame, the fork having a tine extending therefrom in a direction of the groove system, the tine having an eyelet formed thereon and configured for seating within the groove system; a hook partially disposed in the body, the hook having a barb disposed apart from the body and an eye within the body alignable with the eyelet of the tine; and a retention device adapted for insertion through a surface of the body and for extension through the eye and eyelet to secure the fork to the body.

Embodiment 2

The modifiable spinnerbait system as in Embodiment 1, wherein the fork includes at least two tines, and the groove system includes at least two channels to receive the respective tines therein.

Embodiment 3

The modifiable spinnerbait system as in Embodiments 1 or 2, wherein the retention device is a screw having a set of threads and a receiver having a set of complementary threads to receive the threads of the screw.

Embodiment 4

The modifiable spinnerbait system as in any of the foregoing embodiments, wherein the retention device can be adjusted using a hand tool, more particularly an Allen wrench or a screwdriver.

Embodiment 5

A modifiable spinnerbait system, comprising a modular spinnerbait head having a body and a bilateral groove system formed within the body; a fork connectable to a spinnerbait wire frame, the fork having two tines extending therefrom in a direction of the groove system, the tines each having an eyelet formed thereon and configured for seating within the groove system; a hook having a barb disposed apart from the body and an eye disposed within the body and alignable with the eyelets of the tines when seated within the bilateral groove system; and a retention device adapted for insertion through a surface of the body and for extension through the eye and eyelet to secure the fork to the body.

Embodiment 6

The modifiable spinnerbait system as in Embodiment 5, wherein the retention device includes a screw having a set of threads and a receiver having a set of complementary threads to receive the threads of the screw.

Embodiment 7

The modifiable spinnerbait system as in Embodiments 5 or 6, wherein the retention device can be adjusted using a hand tool, more particularly an Allen wrench or a screwdriver.

Embodiment 8

A modifiable spinnerbait system, comprising a modular spinnerbait head having a body and a groove system formed within the body; a spinnerbait wire frame having a fork extending therefrom, the fork defining a tine extending in a direction of the groove system, the tine having an eyelet formed thereon and configured for seating within the groove system; a hook partially disposed in the body, the hook having a barb disposed apart from the body and an eye within the body alignable with the eyelet of the tine; and a retention device adapted for insertion through a surface of the body and for extension through the eye and eyelet to secure the fork to the body.

Embodiment 9

The modifiable spinnerbait system as in Embodiment 8, wherein the fork includes at least two tines, and the groove system includes at least two channels to receive the respective tines therein.

Embodiment 10

A modifiable spinnerbait system, comprising a modular spinnerbait head having a body and a groove system formed within the body; a spinnerbait wire frame having a fork extending therefrom, the fork defining a tine extending in a direction of the groove system, the tine having an eyelet formed thereon and configured for seating within the groove system; a hook partially disposed in the body, the hook having a barb disposed apart from the body and an eye within the body alignable with the eyelet of the tine; and a pivoting retention device adapted for insertion through a surface of the body and for extension through the eye and eyelet to secure the fork to the body, the pivoting retention device being configured to cause the modular spinnerbait head to pivot relative to the spinnerbait wire frame.

Embodiment 11

A modifiable spinnerbait system, comprising a modular spinnerbait head having a body and a bilateral groove system formed within the body; a fork welded to a spinnerbait wire frame, the fork having two tines extending therefrom in a direction of the groove system, the tines each having an eyelet formed therein and configured for seating within the groove system, at least one tine having a receiver connected thereto, the receiver having threads formed therein, a hook having a barb disposed apart from the body and an eye disposed within the body and alignable with the eyelets of the tines when seated within the bilateral groove system; and a retention device adapted for insertion through a surface of the body and for extension through the eye and eyelet into the receiver to secure the fork to the body.

Embodiment 12

The modifiable spinnerbait system as in Embodiment 11, wherein the retention device is a screw having a set of threads complementary to the threads of the receiver, the screw being connectable to the receiver.

Embodiment 13

The modifiable spinnerbait system as in Embodiment 11 or 12, wherein the retention device is adjusted using a hand tool.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A modifiable spinnerbait system, comprising:
    a modular spinnerbait head having a body and a bilateral groove system formed within the body;
    a fork fixed to a spinnerbait wire frame, the fork having two tines extending therefrom in a direction of the groove system, the tines each having an eyelet formed therein and configured for seating within the groove system, at least one tine having a receiver affixed thereto;
    a hook having a barb disposed apart from the body and an eye disposed within the body and alignable with the eyelets of the tines when seated within the bilateral groove system; and
    a retention device adapted for insertion through a surface of the body and for extension through the eye and eyelet into the receiver to secure the fork to the body.

2. The modifiable spinnerbait system as in claim 1, wherein the receiver includes threads formed therein, and the retention device is a screw having a set of threads complementary to the threads of the receiver, the complementary threads of the screw being connectable to the threads of the receiver.

3. The modifiable spinnerbait system as in claim 1, wherein the retention device is adjusted using a hand tool.

* * * * *